US008327339B2

(12) United States Patent
Scholz et al.

(10) Patent No.: US 8,327,339 B2
(45) Date of Patent: Dec. 4, 2012

(54) METHOD AND SYSTEM FOR FAST STATIC TAINT ANALYSIS

(75) Inventors: Bernhard F. Scholz, Sydney (AU); Chenyi Zhang, Kensington (AU); Cristina N. Cifuentes, Forest Lake (AU)

(73) Assignee: Oracle America, Inc., Redwood City, CA (US)

( * ) Notice: Subject to any disclaimer, the term of this patent is extended or adjusted under 35 U.S.C. 154(b) by 1047 days.

(21) Appl. No.: 12/165,533

(22) Filed: Jun. 30, 2008

(65) Prior Publication Data
US 2009/0328009 A1 Dec. 31, 2009

(51) Int. Cl.
*G06F 9/44* (2006.01)

(52) U.S. Cl. ........................ 717/132
(58) Field of Classification Search .......... 717/132
See application file for complete search history.

(56) References Cited

U.S. PATENT DOCUMENTS

| | | | | |
|---|---|---|---|---|
| 5,920,716 A * | 7/1999 | Johnson et al. | ......... | 717/141 |
| 5,937,195 A * | 8/1999 | Ju et al. | ......... | 717/156 |
| 6,286,135 B1 * | 9/2001 | Santhanam | ......... | 717/146 |
| 2004/0015919 A1 * | 1/2004 | Thompson et al. | ......... | 717/152 |
| 2008/0040586 A1 * | 2/2008 | Colavin et al. | ......... | 712/226 |

OTHER PUBLICATIONS

Tip F., A Survey of Program Slicing Techniques, Journal of Programming Languages (1995).*
Ramalingam, G., On Sparse Evaluation Representation, IBM T.J. Watson Research Center (1997).*
Ball, T. and Rajamani, S. K., The Slam Project: Debugging System Software via Statice Analysis, Principles of Programming Languages, Jan. 16-18, 2002, Portland, Oregon, 3 pages.
Ballance, R. A., MacCabe, A. B., and Ottenstein, K. J., The Program Dependence Web: A Representation Supporting Control-, Data-, and Demand-Driven Interpretation of Imperative Languages, Proceedings of the ACM SIGPLAN '90 Conference on Programming Language Design and Implementation, Jun. 20-22, 1990, White Plains, New York, 15 pages.
Bell, D. E., and La Padula, L. J., Secure Computer System: Unified Exposition and Multics Interpretation, Technical Report MTR-2997 Rev. 1, Mar. 1976, Bedford, Massachusetts, 134 pages.
Bush, W. R., Pincus, J. D., and Sielaff, D. J., A Static Analyzer for Finding Dynamic Programming Errors, Software Practice Experience, Jun. 2000, 28 pages.
Clause, J., Li, W., and Orso, Alessandro, Dytan: A Generic Dynamic Taint Analysis Framework, International Symposium on Software Testing and Analysis, Jul. 9-12, 2007, London, England, 11 pages.

(Continued)

*Primary Examiner* — Wei Zhen
*Assistant Examiner* — Kevin Dothager
(74) *Attorney, Agent, or Firm* — Osha Liang LLP

(57) ABSTRACT

A method for detecting user input dependence in software code. The method including representing the software code with a reachability graph having: a plurality of nodes, where a root node of the plurality of nodes represents an input controlled by a user; a first directed edge connecting a first node of the plurality of nodes and a second node of the plurality of nodes, where the first directed edge represents a data dependency; and a second directed edge connecting a third node of the plurality of nodes and a fourth node of the plurality of nodes, wherein the second directed edge represents a data dependency. The method also includes identifying a fifth node of the plurality of nodes as a reachable node from the root node by traversing the reachability graph from the root node to the reachable node; and marking a portion of the software code represented by the reachable node as user input dependant.

14 Claims, 6 Drawing Sheets

OTHER PUBLICATIONS

Cytron, R., et al., Efficiently Computing Static Single Assignment Form and the Control Dependence Graph, ACM Transactions on Programming Languages and Systems, Mar. 7, 1991, 52 pages.

Das, M., Lerner, S., and Seigle, M., ESP: Path-Sensitive Program Verification in Polynomial Time, Programming Language Design and Implementation, Jun. 17-19, 2002, Berlin, Germany, 12 pages.

Deutsch, A., Static Verification of Dynamic Properties, PolySpace Technologies, Nov. 27, 2003, 8 pages.

Engler, D., Chelf, B., Chou, A., and Hallem, S., Checking System Rules Using System-Specific, Programmer-Written Compiler Extensions, Oct. 2000, Stanford, California, 16 pages.

Ferrante, J., Ottenstein, K. J., and Warren, J. D., The Program Dependence Graph and Its Use in Optimization, ACM Transactions on Programming Languages and Systems, Jul. 1987, vol. 9, No. 3, 31 pages.

Flanagan, C., et al., Extended Static Checking for Java, Programming Language Design and Implementation, Jun. 17-19, 2002, Berlin, Germany, 12 pages.

Foster, J. S., Fahndrich, M., and Aiken, A., A Theory of Type Qualifiers, In Proceedings of the ACM SIGPLAN '99 Conference on Programming Language Design and Implementation, May 1999, Atlanta, Georgia, 12 pages.

Goguen, J. A. and Meseguer, J., Security Policies and Security Models, Proceedings of the 1982 Symposium on Security and Privacy, Apr. 26-28, 1982, 10 pages.

Hammer, C., Krinke, J., and Snelting, G., Information Flow Control for Java Based on Path Conditions in Dependence Graphs, Mar. 2006, 10 pages.

Lengauer, T. and Tarjan, R. E., A Fast Algorithm for Finding Dominators in a Flowgraph, ACM Transactions on Programming Languages and Systems, Jul. 1979, 21 pages.

Moore, D., et al., Inside the Slammer Worm, IEEE Security & Privacy, Jul. 2003, 7 pages.

Pistoia, M., Flynn, R. J., Koved, L., and Sreedhar, V. C., Interprocedural Analysis for Privileged Code Placement and Tainted Variable Detection, European Conference on Object-Oriented Programming, Jul. 2005, 25 pages.

Newsome, J. and Song, D., Dynamic Taint Analysis for Automatic Detection, Analysis, and Signature Generation of Exploits on Commodity Software, May 2004, Last updated Jul. 2005, 17 pages.

Reps, T., Horwitz, S., and Sagiv, M., Precise Interprocedural Dataflow Analysis via Graph Reachability, Jan. 23-25, 1995, 14pages.

Ragle, D., Introduction to Perl's Taint Mode, May 2006, 9 pages.

Sabelfeld, A. and Myers, A. C., Language-Based Information-Flow Security, IEEE Journal on Selected Areas in Communication, Jan. 2003, vol. 21, No. 1, 15 pages.

Snelting, G., Robshink, T., and Krinke, J., Efficient Path Conditions in Dependence Graphs for Software Safety Analysis, Oct. 2006, 42 pages.

Tu, P. and Padua, D., Efficient Building and Placing of Gating Functions, Jun. 1995, 14 pages.

Wassermann, G. and Su, Z., Sound and Precise Analysis of Web Applications for injection Vulnerabilities, Programming Language Design and Implementation, Jun. 11-13, 2007, San Diego, California, 10 pages.

Xu, W., Bhatkar, S., and Sekar, R., Taint-Enhanced Policy Enforcement: A Practical Approach to Defeat a Wide Range of Attacks, Aug. 2006, 16 pages.

US-CERT, Vulnerability Note VU#881872, Sun Solaris telnet authentication bypass vulnerability, Feb. 10, 2007, 2 pages.

Weiss, M., The Transitive Closure of Control Dependence: The Iterated Join, ACM Letters on Programming Languages and Systems, Jun. 1992, vol. 1, No. 2, 13 pages.

Christiansen, T., perlsec—Perl security, http://www.perl.com/doc/manual/html/pod/perlsec.html, Nov. 1997, 7 pages.

Kam, J. B. and Ullman, J. D., Global Data Flow Analysis and Iterative Algorithms, Jan. 1976, 14 pages.

* cited by examiner

Code 310

```
0    #define BUFSIZ 80
1    void copy_to_utf()
2    {
3        int n;
4        int i;
5        int j;
6        char x[BUFSIZ];
7        char y[BUFSIZ];
8        ...
9        n = in(n);
10       if (n>0)
11       {
12           j=0;
13           for (i=0; i<n; i++)
14           {
15               y[j++] = x[i];
16               y[j++] = 0;
17           }
18       }
19       ...
20   }
21
22   int in(int a)
23   {
24       int c = getchar();
25       if (isdigit(c))
26       {
27           a = a + c – '0';
28       }
29       return a;
30   }
```

FIGURE 3A

Augmented Static
Single Assignment
Form
320

```
0       ...
1       n₁ := in(n₀);
2       p₀ := (n₁>0);
3       if (¬p₀) goto ex;
4       j₀ := 0;
5       i₀ := 0;
6   lp:  i₁ := Φ'(i₀,i₂;p₁);
7        j₁ := Φ'(j₀,j₃;p₁);
8        p₁ := (i₁<n₁);
9        if (¬p₁) goto ex;
10       t₀ := load x(i₁);
11       store y(j₁),t₀;
12       j₂ := j₁+1;
13       store y(j₂),0;
14       j₃ := j₂+1;
15       i₂ := i₁+1;
16       goto lp;
17  ex:  ...
18
19      int in(int a₀)
20      {
21          c₀ := getchar();
22          p₂ := isdigit (c₀);
23          if (¬p₂) goto br;
24          a₁ := a₀+c₀-10;
25  br:     a₂ := Φ'(a₀,a₁;p₂);
26          return a₂;
27      }
```

FIGURE 3B

METHOD AND SYSTEM FOR FAST STATIC TAINT ANALYSIS

BACKGROUND OF INVENTION

Systems and/or software can be exploited through user input. In particular, malicious input can be used to gain control over a system, which may result in the compromise of thousands of computer systems and/or software applications and possibly cause financial harm.

One method of finding code that can be exploited through user input is manual code inspection. However, manual code inspection may be time-consuming, repetitive, and tedious. Accordingly, bug checking tools that use static program analysis have been developed to identify source code that is explicitly data dependent from user input within the software. Bug checking tools track and mark data from untrusted sources (e.g., user input and/or other external data source) as tainted data by tracking explicit data dependencies from external data. Specifically, if a value on the right-hand side of an assignment is tainted, then the variable on the left-hand side is also considered tainted since the variable on is explicitly data dependent on the right-hand side of the assignment. Thereafter, all tainted values may be inspected manually to find software code that can be exploited through user input. Accordingly, tracking data dependencies provides a way to identify code reachable by user input through data dependencies and reduces the amount of code that has be inspected manually to check for potential exploitation.

SUMMARY OF INVENTION

In general, in one aspect, the invention relates to a method for detecting user input dependence in software code, comprising: representing the software code with a reachability graph having: a plurality of nodes, wherein a root node of the plurality of nodes represents an input controlled by a user; a first directed edge connecting a first node of the plurality of nodes and a second node of the plurality of nodes, wherein the first directed edge represents a data dependency; and a second directed edge connecting a third node of the plurality of nodes and a fourth node of the plurality of nodes, wherein the second directed edge represents a data dependency; identifying a fifth node of the plurality of nodes as a reachable node from the root node by traversing the reachability graph from the root node to the reachable node; and marking a portion of the software code represented by the reachable node as user input dependent.

In general, in one aspect, the invention relates to a method for identifying user-input dependence in a software code, comprising: representing the software code in an Augmented Static Single Assignment (aSSA) form, the aSSA form comprising an augmented phi-node corresponding to a confluence point in the software code, the augmented phi-node representing control dependency and data dependency in an explicit format; forming a reachability graph of the software code based on the aSSA form; and identifying the user-input dependency in the software code based on the reachability graph.

In general, in one aspect, the invention relates to a system for detecting user input dependence in software code, comprising: a static analysis engine comprising functionality to: represent the software code with a reachability graph having: a plurality of nodes, wherein a root node of the plurality of nodes represents an input controlled by a user; a first directed edge connecting a first node of the plurality of nodes and a second node of the plurality of nodes, wherein the first directed edge represents a data dependency; and a second directed edge connecting a third node of the plurality of nodes and a fourth node of the plurality of nodes, wherein the second directed edge represents a data dependency; identify a fifth node of the plurality of nodes as a reachable node from the root node by traversing the reachability graph from the root node to the reachable node; and an indicator marking a portion of the software code represented by the reachable node as user input dependant.

In general, in one aspect, the invention relates to a computer readable medium comprising instructions for detecting user input dependence in software code, the instructions comprising functionality for: representing the software code with a reachability graph having: a plurality of nodes, wherein a root node of the plurality of nodes represents an input controlled by a user; a first directed edge connecting a first node of the plurality of nodes and a second node of the plurality of nodes, wherein the first directed edge represents a data dependency; and a second directed edge connecting a third node of the plurality of nodes and a fourth node of the plurality of nodes, wherein the second directed edge represents a data dependency; identifying a fifth node of the plurality of nodes as a reachable node from the root node by traversing the reachability graph from the root node to the reachable node; and marking a portion of the software code represented by the reachable node as user input dependant.

Other aspects and advantages of the invention will be apparent from the following description and the appended claims.

BRIEF DESCRIPTION OF DRAWINGS

FIG. 3A shows sample code in accordance with one or more embodiments of the invention.

FIG. 3B shows code in an augmented Static Single Assignment (aSSA) form in accordance with one or more embodiments of the invention.

DETAILED DESCRIPTION

Figure 1:
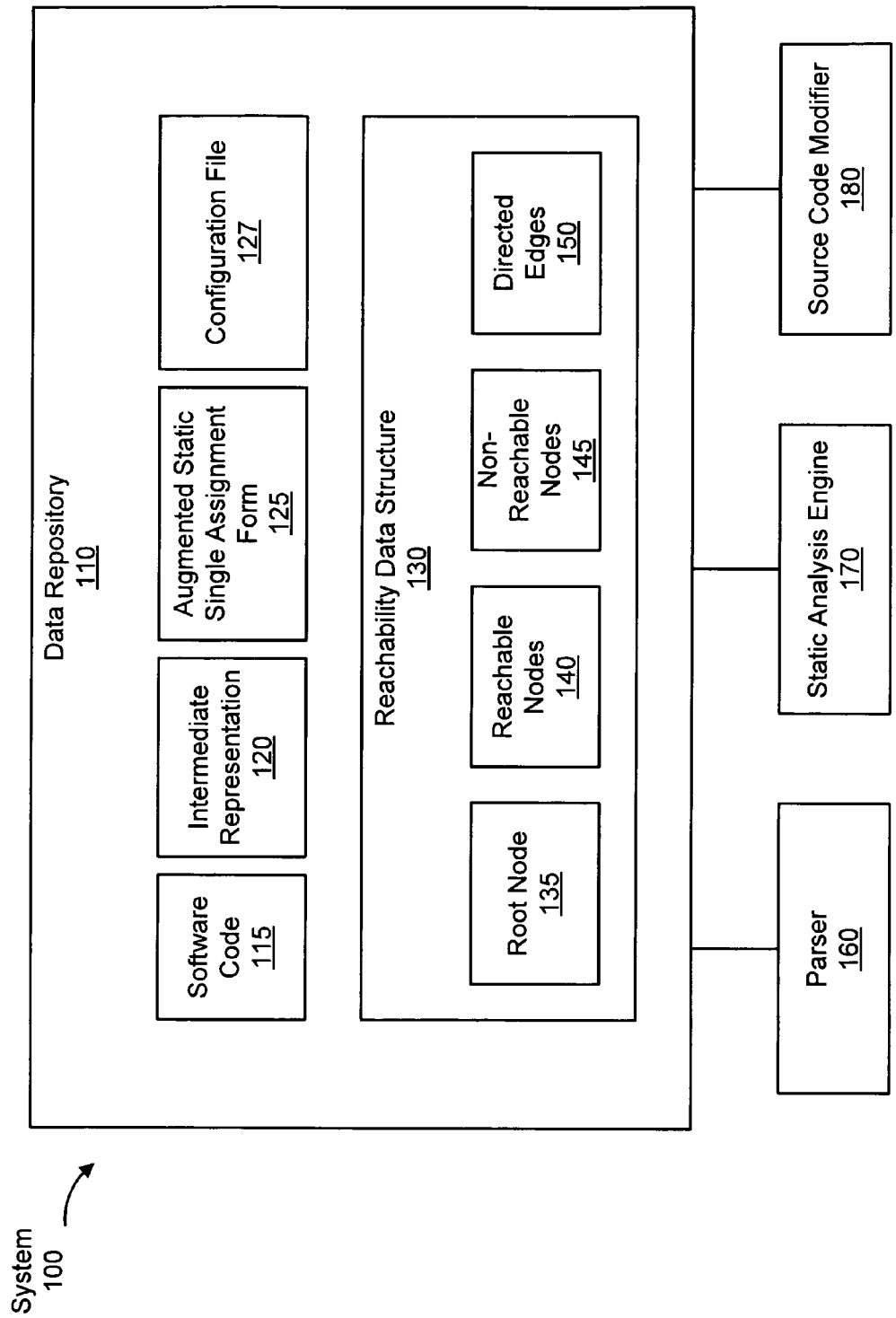
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method for detecting user input dependence in software code. Specifically, embodiments of the invention provide a method and system for tracking both control dependencies and data dependencies to identify user input dependence.

FIG. 1 shows a system (100) in accordance with one or more embodiments of the invention. As shown in FIG. 1, the system (100) includes a data repository (110), a parser (160), a static analysis engine (170), and a software code modifier (180). Each of these components are described below and may be located on the same device (e.g., a server, mainframe, desktop personal computer (PC), laptop, personal desktop assistant (PDA), television, cable box, satellite box, kiosk, telephone, mobile phone, or other computing devices) or may be located on separate devices coupled by a network (e.g., Internet, Intranet, Extranet, Local Area Network (LAN), Wide Area Network (WAN), or other network communication methods), with wire and/or wireless segments in a manner shown and described in relation to FIG. 4 below.

In one or more embodiments of the invention, the system (100) is implemented using a client-server topology. The system (100) itself may correspond to an enterprise application running on one or more servers, and in some embodiments could be a peer-to-peer system, or resident upon a single computing system. In addition, the system (100) is accessible from other machines using one or more interfaces (not shown). In one or more embodiments of the invention, the system (100) is accessible over a network connection (not shown), such as the Internet, by one or more users. Information and/or services provided by the system (100) may also be stored and accessed over the network connection.

In one or more embodiments of the invention, the data repository (110) corresponds to a data storage device that includes functionality to store software code (115), intermediate representation (120), augmented Static Single Assignment (aSSA) form (125), a configuration file (127), and a reachability data structure (130) (e.g., a rooted directed graph). In one or more embodiments of the invention, access to the data repository (110) is restricted and/or secured. As such, access to the data repository (110) may require authentication using passwords, secret questions, personal identification numbers (PINs), biometrics, and/or any other suitable authentication mechanism. Those skilled in the art will appreciate that elements or various portions of data stored in the data repository (110) may be distributed and stored in multiple data repositories. In one or more embodiments of the invention, the data repository (110) is flat, hierarchical, network based, relational, dimensional, object modeled, or structured otherwise. For example, the data repository may be maintained as a table of a SQL database. In addition, data in the data repository (110) may be verified against data stored in other repositories.

Continuing with FIG. 1, in one or more embodiments of the invention, the software code (115) in the data repository (110) may correspond to code written in a high level programming language, a low level programming language, byte code and/or any other suitable form. A statement within the software code (115) may correspond to simple statements, compound statements, declarations, or any other element in code. Errors within the statements may be exploited by external input (e.g., user input). For example, an input value that is used as an array index may be greater than the size of the array.

In one or more embodiments of the invention, the aSSA form (125) corresponds to a representation of the software code (115) that extends a Static Single Assignment (SSA) form by capturing control dependencies that are abstractions of gating functions. In the SSA form (not shown), higher-level control-flow constructs are reduced to if-gotos. The SSA form may denote an assignment using a phi-node. For example, in the SSA form an assignment statement may be denoted by $x:=\Phi(y_1,\ldots,y_k)$, where the values $y_1,\ldots,y_k$ in the phi-node represent statements within the code that result in assignment of a value to x. The aSSA form (125) builds on the SSA form by making control dependencies explicit upon the values in phi-nodes, in accordance with one or more embodiments of the invention. In the aSSA form (125), all variables have single assignments, and at confluence points augmented phi-nodes may incorporate both control and data dependencies. At a confluence point x, where predicates $p_1,\ldots,p_j$ control the selection from a definition of variables $y_1,\ldots,y_k$ the augmented phi-node may be written as $x:=\Phi'(y_1,\ldots,y_k;p_1,\ldots,p_j)$. Accordingly, the aSSA form (125) may explicitly capture the definition of variables as well as the predicates upon which the selection of the definitions depends. In one or more embodiments of the invention, predicates $p_1,\ldots,p_j$ are the set of nodes which contribute to the selection from the set of nodes $y_1,\ldots,y_k$, however, $p_1,\ldots p_j$ may not explicitly state how to make the choice. Further, the predicate nodes $p_1,\ldots,p_j$ are defined as controlling the order of elements $y_1,\ldots,y_k$ in a path leading to x, e.g., controlling which elements from $y_1,\ldots,y_k$ are assigned to x. Accordingly, nodes that only affect the reachability of x (without affecting the assignment of x) are excluded from predicate nodes $p_1,\ldots,p_j$ for x.

In one or more embodiments of the invention, the configuration file (127) specifies which global variables, function arguments, and function results are tainted (e.g., dependent on external data) for library code (e.g. the standard C library). In addition, the configuration file (127) may describe a flow of information that is implemented in the software code (115) (e.g., libraries). For example, the configuration file may declare tainted data with a qualifier "tainted". Example 1, shown below, shows a portion of an exemplary standard C library configuration file, where a main function has two tainted input parameters argc and argv that are controlled by the user. Those skilled in the art will appreciate that the following portion is provided for exemplary purposes only and accordingly should not be construed as limiting the scope of the invention in any way.

Example 1

Excerpt of Configuration File

```
tainted stdin;
tainted int scanf (const char*, tainted...);
tainted int getchar (void);
tainted char* gets (tainted char*);
int main (tainted int argc, tainted char **argv);
char* strcpy (char *str1, char *str2) {str1 = str2; return str2;}
void* malloc (size_t size) {return size;}
int isdigit (int n) {return n;}
```

In one or more embodiments of the invention, the reachability data structure (130) corresponds to a representation of the aSSA form (125) of the software code (115). In one or more embodiments of the invention, the reachability data structure (130) is implemented as a reachability graph (i.e., a rooted directed graph) that includes a root node (135), reachable nodes (140), non-reachable nodes (145) and directed edges (150). The root node (135) corresponds to user input of the software code (115) that may be used to unintentionally or intentionally exploit a software and/or hardware system. Accordingly, the root node (135) is considered tainted. The remaining nodes (e.g., reachable nodes (140) and non-reachable nodes (145)) within the reachability data structure (130) correspond to instructions, functions, function arguments, and/or variables, in accordance with one or more embodiments of the invention. A portion of the directed edges (150)

that connect the nodes (e.g., starting from the root node (135) directly or indirectly to the reachable nodes (140) and non-reachable nodes (145)) correspond to data dependencies between the nodes and another portion of the directed edges (150) correspond to control dependencies between the nodes. Data dependencies include explicit dependencies based on assignment of a variable or value to another variable. Control dependencies include implicit data dependencies, including node selection dependencies which result in selection of statements determining which value is assigned to a variable. Nodes that may be reached, directly or indirectly, by traversing the reachability data structure (130) starting from the root node (135) in the direction of the directed edges (150) are considered reachable nodes (140). Reachable nodes correspond to variables and predicates whose values might be explicitly dependent on tainted data (through assignment) or implicitly dependent on tainted data (e.g., a control dependency), where tainted data controls depend on whether the reachable node is accessed during runtime (e.g., tainted data in a conditional if statement that determines which value is to be assigned to the variable). Nodes that cannot be reached, directly or indirectly, by traversing the reachability data structure (150) starting from the root node (135) in the direction of the directed edges (150) are considered as non-reachable nodes (145). Non-reachable nodes (145) are variables and predicates whose values are not dependent on user input and accordingly are non-tainted.

In one or more embodiments of the invention, the parser (160) corresponds to a program(s) that includes functionality to translate the software code (115) to an intermediate representation (120) prior to translation to the aSSA form (125). Those skilled in the art will appreciate that the parser may be replaced with a compiler, which may include functionality to perform lexical analysis, preprocessing, parsing, semantic analysis, code generation, code optimization and/or another suitable method to translate the software code (115). In one or more embodiments of the invention, a compiler may correspond to a low level virtual machine that avoids machine specific constraints, where every value or memory location has an associated type and all instructions obey strict type rules.

In one or more embodiments of the invention, the static analysis engine (170) corresponds to a process, program, and/or system that includes functionality to represent the software code (115), or an intermediate representation (120) of the software code (115), in the aSSA form (125) and generate the reachability data structure (130) using the aSSA form (125) and the configuration file (127). The static analysis engine (170) includes functionality to generate the aSSA form (125) by capturing the user input dependency as a Meet Over all Paths (MOP) solution. In a MOP solution, all paths from the start node (135) to a particular node within the reachability data structure (130) (e.g. in the control flow graph) are captured in the aSSA form (125). In one or more embodiments of the invention, the static analysis engine (170) includes functionality to determine if a particular node in the reachability data structure (130) can be reached. If a particular node can be reached on a path in the reachability data structure (130) through a tainted node, the particular node is considered tainted. Accordingly, if the particular node can be reached through two different paths, one path being tainted and another path being non-tainted, the particular node is considered tainted because at least one route to the particular node is tainted. In one or more embodiments of the invention, a tainted node may result in errors or exploitation as a result of some external data.

In one or more embodiments of the invention, the source code modifier (180) includes functionality to the software code (115) reachable by user input. The source code modifier (180) may be used with the configuration file (127) and an analysis of the reachability data structure (130) to determine which portion of the code to modify. In one or more embodiments of the invention, the code modifier (180) may interact with a user interface (not shown) for identifying and/or modifying code. The user interface may be a web interface, a graphical user interface (GUI), a command line interface, an application interface or any other suitable interface. The interface may also include one or more web pages that can be accessed from a computer with a web browser and/or internet connection. Alternatively, the interface may be an application that resides on a computing system, such as a PC, mobile devices, a PDA, and/or other computing devices of the users, and that communicate with one or more components of the system (100) via one or more network connections and protocols.

Figure 2:
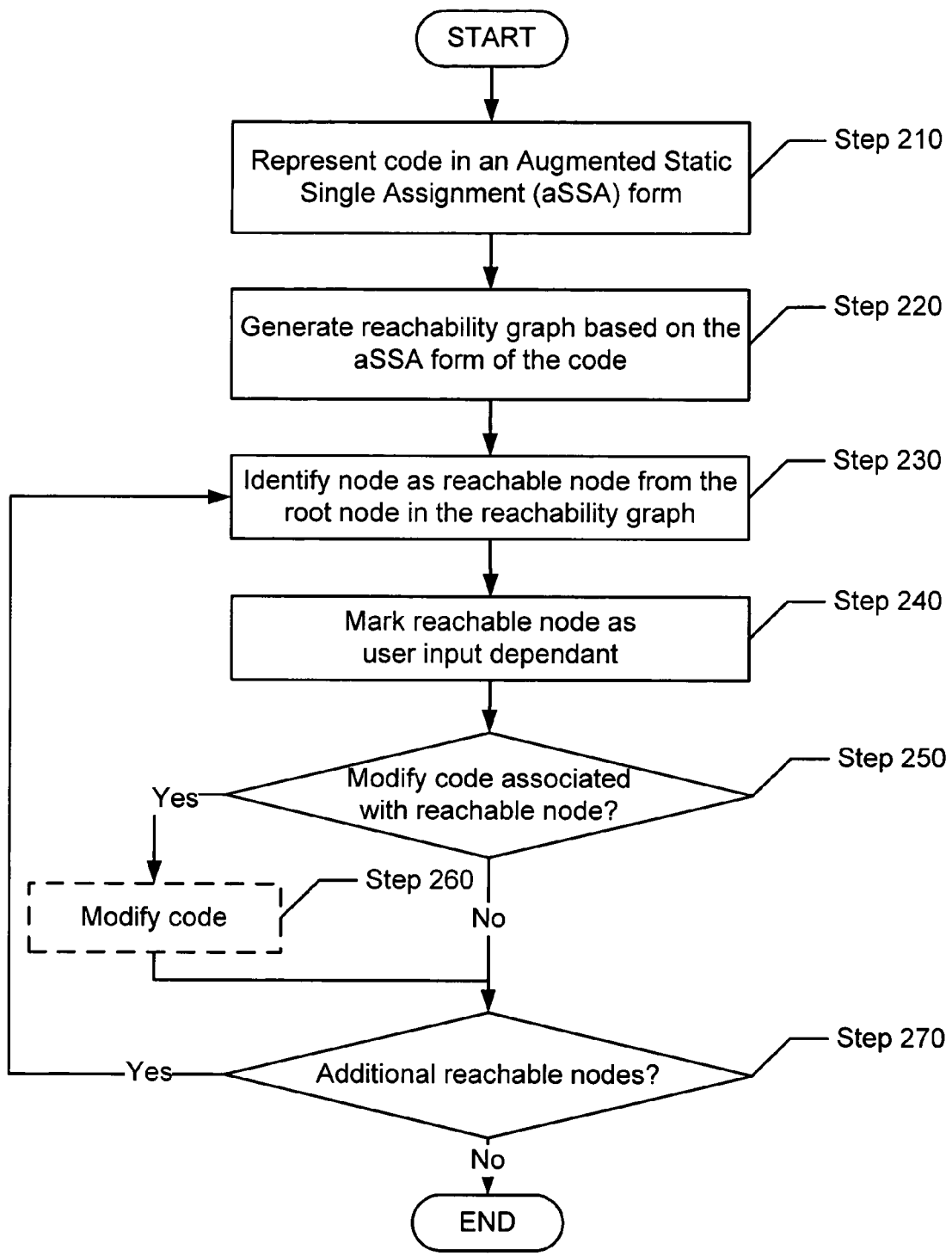
FIG. 2 shows a flow chart in accordance with one or more embodiments of the invention.

FIG. 2 shows a flow chart in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Specifically, FIG. 2 shows a flow chart for detecting user input dependence in software code. Initially code is represented in aSSA form (Step 210). Representing the code in aSSA form may involve intermediate forms. For example, if the code is initially in a high-level programming language, the code may directly be represented in the aSSA form or may first be translated to byte code and then represented in aSSA form. In one or more embodiments of the invention, representing the code in aSSA form includes capturing both explicit data dependencies (e.g., assignments) and implicit data dependencies (e.g., control dependencies that determine which assignments are executed) on a path to confluence points. Furthermore, in the aSSA form each variable is given one assignment. For example, when two statements within the code, each assign a value to the same variable in code, the different occurrences of the variable in software code are represented with different variables in aSSA form (e.g., $v_0$ and $v_1$ may be used to represent variable v). Furthermore higher-level control-flow constructs (e.g., for loops and while loops) are represented with if-gotos.

Figure 3C:
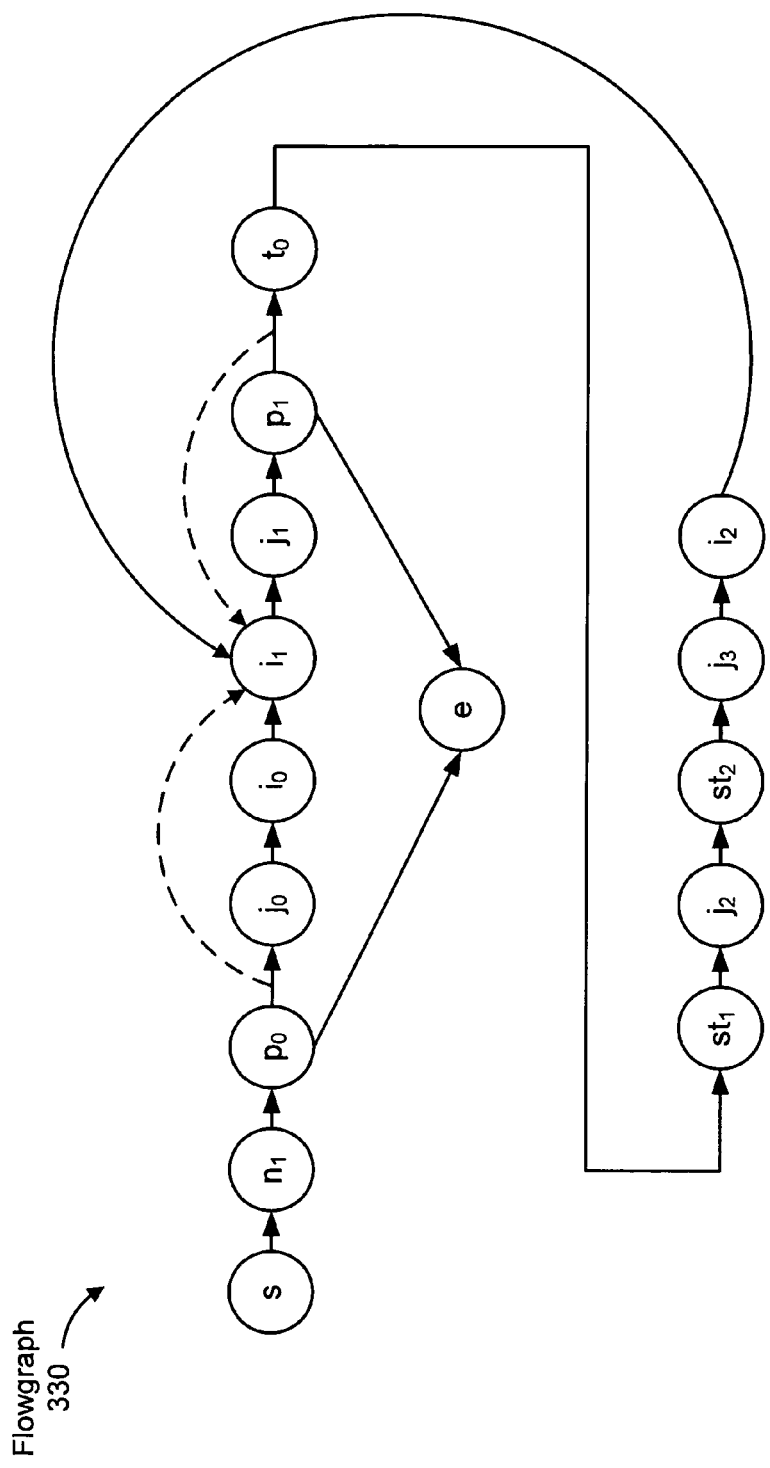
FIG. 3C shows a directed graph in accordance with one or more embodiments of the invention.

In one or more embodiments of the invention, a reachability graph or other suitable reachability data structure is generated based on the aSSA form of the code (Step 220). The statements and predicates in the aSSA form are represented individually in the reachability data structure, e.g., as nodes in a reachability graph. Furthermore, directed edges between nodes in the reachability data structure are used to represent the data dependencies, e.g., explicit data dependencies such as assignments and implicit data dependencies that result in selection and execution of an assignment statement. In one or more embodiments of the invention, the reachability data structure may be generated by using the aSSA form to first generate a system of simultaneous data flow equations that are formulated over Meet Over all Paths (MOP) solution for a particular node in the aSSA form. The system of simultaneous data flow equations captures all paths leading to the particular node. The system of simultaneous data flow equations or a reduced version of the system of simultaneous data flow equations may be used to find the MOP solution. In one or more embodiments of the invention, a flowgraph may be constructed by building the flowgraph starting from the root node, a particular node being analyzed, or any other suitable node. An exemplary flowgraph is shown in FIG. 3C and discussed below. Based on the flowgraph, the input (control and data dependencies) to a particular node may be determined for the reachability graph. Once the input for all nodes is determined, the reachability graph may be constructed. In another embodiment of the invention, alternate methods for construction of the reachability graph may be used. For example, the output for one or more nodes may be determined and used to construct the reachability graph.

In one or more embodiments of the invention, a node within the reachability graph is identified as a reachable node from the root node in the reachability graph (Step 230). As discussed above, a root node corresponds to external data and accordingly, a reachable node from the root node is a tainted node due to data and control dependencies from the root node. In one or more embodiments of the invention, any data structure traversal technique may be used to identify one or more nodes as reachable nodes from the root node. In an embodiment of the invention, all paths that lead to a particular node may be identified. If one of the paths to the particular node originates from the root node, the particular node may be identified as a reachable node. Further, if no path from the root node leads to the particular node, then the particular node may not be identified as a reachable node and is strictly non-tainted.

In one or more embodiments of the invention, a reachable node is marked as user input dependent or tainted (Step 240). Marking the reachable node may be accomplished using any known marking, grouping, selecting, commenting or other suitable technique. For example, all software code corresponding to reachable nodes may be highlighted. Another example may involve identifying all the lines associated with tainted data. Yet another example may involve, generating a document including only the tainted software code. In one or more embodiments of the invention, tainted data may be forward to a developer or administrator dynamically as it is discovered for code inspection. Accordingly, marking may simply involve forwarding the tainted data or designated software code as tainted.

In one or more embodiments of the invention, a determination is made whether to modify code represented by the reachable node (Step 250). The determination may be made based on testing the code for errors with certain values of external data and/or manual code inspection. The code may be tested to ensure that external data is properly used and/or modified by the code for its intended purpose. For example, the code may be checked to ensure that a data value cannot be used as an index value for an array or an address reference that can lead to execution of malicious data. Accordingly, the code may be modified to remove an error or otherwise modify the code to remove or reduce possible exploitation through user input (Step 260). The original high-level or low-level code may be modified by a process, program, system, user, and/or other suitable entity. The modification may involve rearrangement of statements, error checks, code design changes, or any other suitable modification that removes a potentially exploitable error in the software code. In one or more embodiments of the invention, steps 250 and 260 may be skipped altogether, i.e., tainted code may simply be identified. Further, the identification of tainted code may be stored and/or provided for code inspection. A determination is then made as to whether any additional nodes exist (Step 270). If there are additional nodes, the flow returns to step 230.

FIGS. 3A-3C show examples in accordance with one or more embodiments of the invention. In particular, FIG. 3A shows a sample code (310) that is analyzed to detect user input dependence. The exemplary C-code fragment copies a character-string to a Unicode Transformation Format (UTF) array. The function declares two character arrays x and y of the same fixed size on lines 6 and 7. The variable n has value zero before entering the code fragment and is passed on to the function in( ). Function in( ) reads a single character from standard input. If the character is a digit, then the value of the character is added to argument a and returned by the function in( ). The result of in( ) is assigned to variable n and checked to be greater than 0. Inside the then-branch, the for-loop controls variable i that ranges from 0 to n−1. Inside the loop body, the content of array x is copied to array y, character by character, with an interleaving 0, creating the UTF representation of the character.

In this example, a buffer overflow may occur if the length of array y is too small to hold twice the number of characters of array x. In the in( ) function, the return value of the library function getchar( ) is tainted, e.g., dependent on user input. The buffer overflow poses a potential security risk because the buffer overflow can be exercised via user input.

The aSSA form, of the sample code, is shown in FIG. 3B. In the aSSA form all variables have single assignments, higher-level control-flow constructs are reduced to if-gotos, and at confluence points, augmented phi-nodes are used to capture both control and data dependencies. For example, $i_1$ and $j_1$ are augmented phi-nodes that decide whether the variable values are taken from inside or outside the loop depending on the predicate $p_1$. The predicate $p_0$ of the outer if-statement is not involved in the selection, though both statements are only executable if $p_0$ holds. In one or more embodiments of the invention, the predicates of a node (e.g., $i_1$) may be determined using a flowgraph, as shown in FIG. 3C. As shown in FIG. 3C, the node $i_1$ has two predecessors $i_0$ and $i_2$. The controlling edges of $i_0$ is the set $\{(p_0,j_0)\}$, whereas the controlling edges of $i_2$ is the set $\{(p_0,j_0),(p_1,t_0)\}$. From the graph both $(p_0,j_0)$ and $(p_1,t_0)$ are controlling $i_1$, but in addition $p_1$ is dominated by $i_1$ in a loop, which means $(p_0,j_0)$ will be eliminated from $\{(p_0,i_0),(p_1,t_0)\}$. Therefore, in the augmented phi-node $i_1$, the set of predicates for $i_1$ consists of a single node $p_1$, the predicate that strictly determines the selection for $i_1$ if $i_1$ is to be assigned a value.

Figure 4:
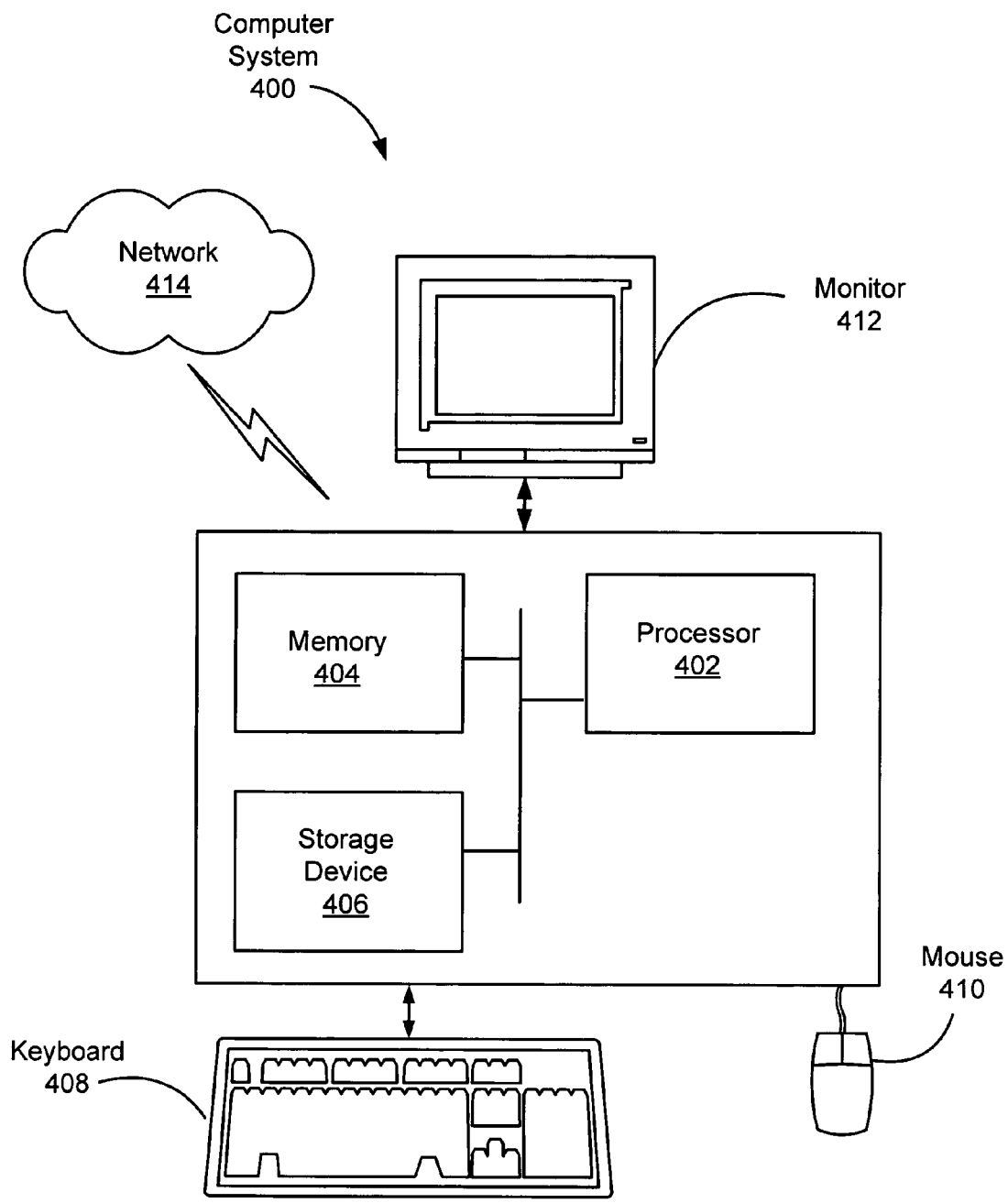
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a LAN or a WAN (e.g., the Internet) (414) via a network interface connection. Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., data repository, static analysis engine, static program analysis tool, statement modifier, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting user input dependence in software code, comprising:
    generating, by a static analysis engine executing on a processor, an Augmented Static Single Assignment (aSSA) form of the software code comprising:
        an augmented phi-node comprising:
            a control dependency to a predicate;
            a first data dependency to a first variable assignment, and
            a second data dependency to a second variable assignment, wherein the first variable assignment and second variable assignment are dependent on the predicate;
    generating, by the static analysis engine, a reachability data structure using the aSSA form of the software code, wherein the reachability data structure comprises:
        a root node representing an input controlled by a user;
        a first node representing the augmented phi-node;
        a second node representing the variable assignment;
        a third node representing the predicate;
        a first directed edge connecting the first node and the second node, wherein the first directed edge represents the data dependency; and
        a second directed edge connecting the first node and the third node, wherein the second directed edge represents the control dependency;
    determining that the first node is reachable by a path from the root node, wherein the path represents a portion of the software code; and
    marking, by a source code modifier executing on the processor, the portion of the software code corresponding to the path as code to modify.

2. The method of claim 1,
    wherein the control dependency selects between execution of a first statement and execution of a second statement,
    wherein execution of the first statement results in an assignment of a first value to a variable, and
    wherein execution of the second statement results in an assignment of a second value to the variable.

3. The method of claim 1, wherein determining that the fifth node is reachable by the path comprises traversing the reachability data structure through the first directed edge.

4. The method of claim 1, wherein the control dependency in an explicit format, the control dependency being associated with a gating function in the software code.

5. The method of claim 4, wherein a confluence point associated with the gating function in the software code is represented by the augmented phi-node in the aSSA form.

6. The method of claim 5,
    wherein the augmented phi-node is denoted as $x := \Phi'(y_1, \ldots, y_k; p_1, \ldots, p_j)$;
    wherein x represents a single assignment variable in the software code;
    wherein $y_1, \ldots, y_k$ represent a plurality of values assignable to x; and
    wherein $p_1, \ldots, p_j$ represent a portion of a plurality of nodes in the reachability graph associated with selecting a value from $y_1, \ldots, y_k$ to assign to x.

7. The method of claim 1, wherein at least one of a plurality of nodes in the reachability graph represents one from a group consisting of an instruction, a function, a function argument, and a variable in the software code.

8. The method of claim 1, further comprising:
    modifying the portion of the software code represented by the first node.

9. A system for detecting user input dependence in software code, comprising:
    a processor
    a static analysis engine, executing on the processor, comprising functionality to:
    generate an Augmented Static Single Assignment (aSSA) form of the software code comprising:
        an augmented phi-node comprising:
            a control dependency to a predicate;
            a first data dependency to a first variable assignment, and
            a second data dependency to a second variable assignment, wherein the first variable assignment and second variable assignment are dependent on the predicate;
    generate a reachability data structure using the aSSA form of the software code, wherein the reachability data structure comprises:
        a root node representing an input controlled by a user;
        a first node representing the augmented phi-node;
        a second node representing the variable assignment;
        a third node representing the predicate;
        a first directed edge connecting the first node and the second node, wherein the first directed edge represents the data dependency; and
        a second directed edge connecting the first node and the third node, wherein the second directed edge represents the control dependency;
    determine that the first node is reachable by a path from the root node, wherein the path represents a portion of the software code; and
    a source code modifier, executing on the processor, configured to mark the portion of the software code corresponding to the path.

10. The system of claim 9,
    wherein the control dependency selects between execution of a first statement and execution of a second statement,
    wherein execution of the first statement results in an assignment of a first value to a variable, and
    wherein execution of the second statement results in an assignment of a second value to the variable.

11. The system of claim 9, wherein the aSSA form comprises the control dependency in an explicit format, the control dependency being associated with a gating function in the software code.

12. The system of claim 11, wherein a confluence point associated with the gating function in the software code is represented by the augmented phi-node in the aSSA form.

13. A non-transitory computer readable medium comprising instructions for detecting user input dependence in software code in software code, the instructions comprising functionality for:

generating, by a static analysis engine executing on a processor, an Augmented Static Single Assignment (aSSA) form of the software code comprising:
  an augmented phi-node comprising:
    a control dependency to a predicate;
    a first data dependency to a first variable assignment, and
    a second data dependency to a second variable assignment, wherein the first variable assignment and second variable assignment are dependent on the predicate;
generating, by the static analysis engine, a reachability data structure using the aSSA form of the software code, wherein the reachability data structure comprises:
  a root node representing an input controlled by a user;
  a first node representing the augmented phi-node;
  a second node representing the variable assignment;
  a third node representing the predicate;
  a first directed edge connecting the first node and the second node, wherein the first directed edge represents the data dependency; and
  a second directed edge connecting the first node and the third node, wherein the second directed edge represents the control dependency;
determining that the first node is reachable by a path from the root node, wherein the path represents a portion of the software code; and
marking, by a source code modifier executing on the processor, the portion of the software code corresponding to the path as code to modify.

14. The non-transitory computer readable medium of claim 13,
  wherein the control dependency selects between execution of a first statement and execution of a second statement,
  wherein execution of the first statement results in an assignment of a first value to a variable, and
  wherein execution of the second statement results in an assignment of a second value to the variable.

\* \* \* \* \*